United States Patent Office 2,868,777
Patented Jan. 13, 1959

2,868,777

O,O'-DIHYDROXYAZO DYESTUFFS AND THEIR METAL COMPLEX COMPOUNDS

Edgar Enders, Leverkusen-Bayerwerk, Germany, assignor to Farbenfabriken Bayer Aktiengesellschaft, Leverkusen, Germany, a corporation of Germany No Drawing. Application February 8, 1956
Serial No. 564,124

6 Claims. (Cl. 260—149)

The present invention relates to monoazo dyestuffs, their metal complex compounds and to a process for their manufacture; more particularly it relates to monoazo dyestuffs of the following general formula:

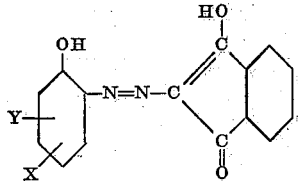

wherein X stands for a sulfamide or an alkyl sulfone radical, Y means hydrogen or a non-ionic substituent, and to the metal complex compounds, in particular the cobalt and chromium complexes of said azo dyestuffs.

It is an object of the present invention to provide new monoazo dyestuffs and their metal complex compounds. It is a further object of the invention to provide new metal containing azo dyestuffs with good fastness properties.

The new metal-free azo dyestuffs may be obtained by coupling o-amino-hydroxy-benzenes which are substituted by a sulfamide or an alkyl sulfone group and which may bear further non-ionic substituents with indandione-(1,3) or with such derivatives thereof which form indandion-(1,3) under the conditions of coupling e. g. indandione-(1,3)-2-carboxylic acid and its functional derivatives.

Suitable o-aminohydroxy-benzenes are e. g. 1-amino-2-hydroxy-benzene-5-sulfonamide, 1-amino-2-hydroxy-benzene-5-sulfomethylamide, 1-amino-2-hydroxy-benzene-5-sulfo-ethylamide, 1-amino-2-hydroxy-benzene-5-sulfo-butylamide, 1-amino-2-hydroxy-benzene-5-sulfo-dimethylamide, 1-amino-2-hydroxy-benzene-5-sulfo-diethylamide, 1-amino-2-hydroxy-benzene-5-sulfo-anilide, 1-amino-2-hydroxy-benzene-4-sulfo-dimethyl-amide, 1-amino-2-hydroxy-benzene-5-methylsulfone, 1-amino-2-hydroxy-benzene-5-chloro-methylsulfone and 1-amino-2-hydroxy-benzene-5-ethylsulfone.

The metal-free azo dyestuffs dye wool by the after-chrome or meta-chrome process in brown shades of good wet-fastness properties and a good light fastness. They can be converted into their metal complex compounds, preferably into their cobalt and chromium complex compounds, alone or in mixture with other known metallizable azo dyestuffs. The metal containing dyestuffs dye wool, silk, polyamide fibres and fibres of similar origin from neutral to weakly acid baths in level red to brown shades of good fastness properties.

The following examples are given for the purpose of illustrating the invention, without, however, limiting it thereto; the parts being by weight if not otherwise stated. The parts by weight and the parts by volume stand in the ratio of grams to millilitres.

Example 1

21.6 parts of 1-amino-2-hydroxy-benzene-5-sulfo-di-methylamide are dissolved in 250 parts by volume of water and 21 parts by volume of concentrated hydrochloric acid and then diazotized at 0–5° C. with a solution of 7.5 parts of sodium nitrite in 20 parts by volume of water within one hour. After the addition of a little amido sulfonic acid, the diazo salt solution is combined with a suspension of 14 parts of indandione-(1,3) in 100 parts by volume of water. Concentrated ammonia is then added dropwise at 5–10° C. until the reaction proceeds permanently alkaline. When coupling has finished, the mixture is heated to 60–70° C. and the dyestuff is precipitated by addition of acid and then filtered. It corresponds to the following formula:

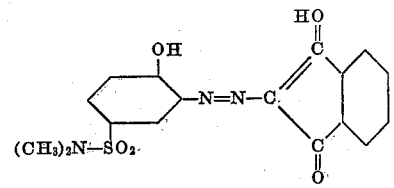

The filter cake thus obtained is dissolved in 800 parts by volume of water with the addition of sodium hydroxide and then mixed while stirring with an ammoniacal solution of 13 parts of crystalline cobalt chloride at 90–95° C. When metallization is complete, the metal containing dyestuff is precipitated by addition of common salt, separated by pressing and dried. It represents a brown powder which dyes wool from neutral bath in level red-brown shades with good fastness properties.

The corresponding chromium complex which can be obtained by known methods dyes wool from neutral bath reddish dark brown shades the fastness to light of which is slightly lower than of the dyeings obtained with the cobalt complex.

Dyestuffs with similar properties are obtained if 1-amio-2-hydroxy-benzene-5-sulfo-diethylamide or 1-amino-2-hydroxy-benzene-5-sulfo-methyl-oxethylamide are used as diazo compounds.

Example 2

20 parts of phthalyl acetic acid are introduced into a solution of 7 parts of sodium in 200 parts by volume of absolute alcohol; dissolution occurs with spontaneous heating. The sodium salt of indandione-(1,3)-2-carboxylic acid thus obtained precipitates after a short time. 200 parts by volume of water and subsequently at 0–5° C. a diazo salt solution obtained in customary manner from 20.2 parts of 1-amino-2-hydroxy-benzene-5-sulfo-methylamide are added. Then concentrated ammonia is added dropwise until the reaction proceeds permanently alkaline. When coupling is complete, the mixture is heated to 60–70° C. and the dyestuff precipitated by addition of acid and filtered. It corresponds to the following formula:

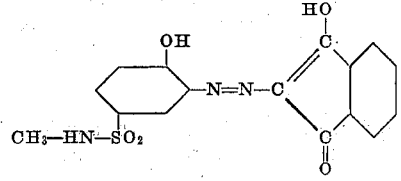

The dyestuff is converted into its cobalt complex compound in the same manner as described in Example 1.

The cobalt containing dyestuff represents a brown powder which dissolves in water with red-brown coloration and dyes wool from neutral bath in level red-brown shades with good fastness properties.

The corresponding chromium complex dyes wool from neutral bath in level reddish dark brown shades.

Dyeings of similar properties are obtained if 1-amino-2 - hydroxy-benzene-5-sulfo-ethylamide, 1 - amino - 2-hydroxy-benzene-5-sulfo - N - butylamide, 1 - amino-2-hydroxy-benzene-5-sulfoanilide or 1-amino-2 - hydroxybenzene-5-sulfonamide are used as diazo compounds.

Example 3

18.7 parts of 1-amino-2-hydroxy-benzene-5-methylsulfone are diazotized in usual manner and combined with a suspension of 14 parts of indandione-(1,3) in 100 parts by volume of water. Concentrated ammonia is dropped into the mixture at 0–5° C. until the reaction proceeds permanently alkaline. When coupling has finished, the mixture is heated to 60–70° C., the dyestuff is separated by addition of acid and filtered. It corresponds to the formula:

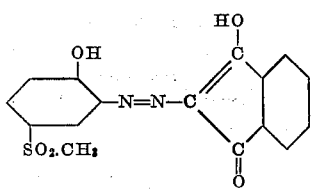

The dyestuff is converted into its cobalt complex in the manner described in Example 1.

The cobalt containing azo dyestuff represents a brown powder which dissolves in water with red-brown coloration and dyes wool from neutral bath in level red-brown shades with good fastness properties.

If 1-amino-2-hydroxy-benzene - 5-chloro-methylsulfone or 1-amino-2-hydroxy-benzene-5-ethyl-sulfone are used as diazo compounds, dyestuffs of similar properties are obtained.

Example 4

9.5 parts of 1-amino-2-hydroxy-benzene-4-sulfo-dimethylamide are dissolved in 3.1 parts of sodium nitrite and 5 parts by volume of 40% sodium hydroxide in 50 parts by volume of water. This solution is added to 20 parts by volume of concentrated hydrochloric acid and 80 parts by volume of ice water at 0–5° C. The formed diazo compound partly precipitates in yellow crystalline form. When diazotization is complete, the mixture is combined with a suspension of 6.5 parts of indandione-(1,3) in 200 parts by volume of ice water. Concentrated ammonia is dropped into the mixture until the reaction proceeds permanently alkaline. When coupling has finished, the mixture is heated to 60–70° C., the dyestuff is precipitated by addition of common salt, isolated by pressing and dried. It corresponds to the formula

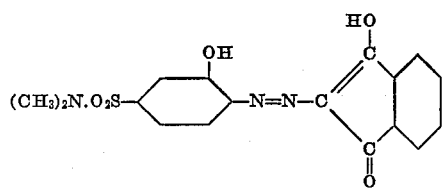

The dyestuff represents a dark brown powder which dyes wool, after-chromed or chromed by the meta-chrome process, in dark brown shades with good fastness to wet processing and to light.

The cobalt complex can be obtained by dissolving the wet dyestuff paste with the addition of 5 parts by volume of 40% sodium hydroxide in 250 parts by volume of water, and adding at 90–95° C. an ammoniacal solution of 6 parts of crystalline cobalt chloride. After one hour's stirring the cobalt containing dyestuff formed is isolated in usual manner and dried. It represents a dark powder which dyes wool from neutral bath in level bluish red shades with good fastness to wet processing and light.

The corresponding chromium complex dyes wool in reddish brown shades with good fastness properties.

Dyestuffs of similar properties are obtained when using the following diazo compounds and coupling them with indandione-(1,3).

| diazo compounds | azo compounds | metal | shades on wool |
|---|---|---|---|
| (5) 1-amino-2-hydroxy-5-chloro-benzene-4-sulfonamide. | indandione-(1,3) | Cr | violet brown. |
| (6) 1-amino-2-hydroxy-5-chloro-benzene-4-sulfonamide. | ...do... | Co | red-brown. |
| (7) 1 - amino - 2 - hydroxy - 5 - methylbenzene - 4 - sulfonamide. | ...do... | Co | Do. |
| (8) 1 - amino - 2 - hydroxy - benzene - 5 - sulfo - o - methoxyanilide. | ...do... | Co | Do. |
| (9) 1 - amino - 2 - hydroxy - benzene - 5 - sulfo - o - chloroanilide. | ...do... | Co | Do. |
| (10) 1 - amino - 2 - hydroxy - benzene - 5 - sulfo - o - methylanilide. | ...do... | Co | Do. |
| (11) 1 - amino - 2 - hydroxy - benzene - 5 - sulfo - γ - methoxy-propylamide. | ...do... | Co | Do. |
| (12) 1 - amino - 2 - hydroxy - 5 - sulfo - (3' - methane - sulfonylamino) - anilide. | ...do... | Co | Do. |
| (13) 1 - amino - 2 - hydroxy - benzene-4-sulfo-anilide. | ...do... | Co | Do. |
| (14) 1 - amino - 2 - hydroxy - benzene - 5 - sulfo - γ - hydroxy-propylamid. | ...do... | Co | Do. |

I claim:

1. A dyestuff selected from the group consisting of monoazo dyestuffs corresponding to the following formula

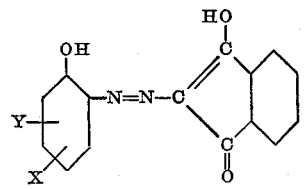

wherein X is a member selected from the group consisting of a sulfonamide, methylsulfone and ethylsulfone radicals, and Y is a member selected from the group consisting of hydrogen, chlorine, and methyl; the chromium complex thereof and the cobalt complex thereof.

2. The cobalt complex of the dyestuff corresponding to the following formula:

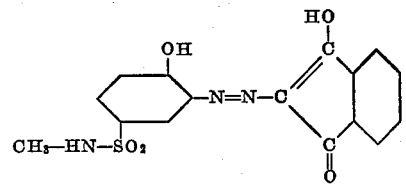

3. The cobalt complex of the dyestuff corresponding to the following formula:

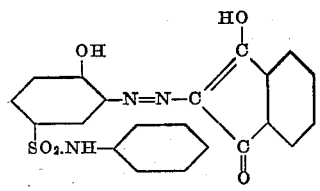

4. The chromium complex of the dyestuff corresponding to the following formula:
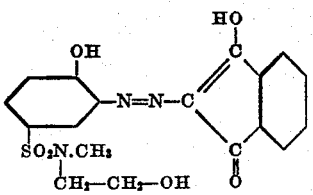
5. The cobalt complex of the dyestuff corresponding to the following formula:
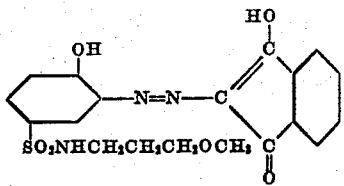
6. The cobalt complex of the dyestuff corresponding to the following formula:
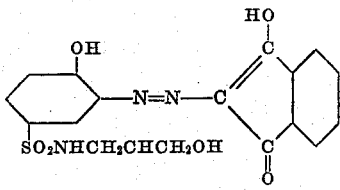
References Cited in the file of this patent
UNITED STATES PATENTS
| | | |
|---|---|---|
| 1,233,433 | Wuth et al. | July 17, 1917 |
| 2,673,199 | Widmer et al. | Mar. 23, 1954 |